| | | |
|---|---|---|
| United States Patent [19] | [11] | 4,014,833 |
| Story | [45] | Mar. 29, 1977 |

[54] AQUEOUS PRINTING INK WITH POLYETHYLENE OXIDE

[75] Inventor: Augustus L. Story, Toledo, Ohio

[73] Assignee: Owens-Illinois, Inc., Toledo, Ohio

[22] Filed: Nov. 28, 1975

[21] Appl. No.: 635,819

[52] U.S. Cl. .......................... 260/29.2 EP; 106/20; 106/31; 260/22 CQ; 260/DIG. 38

[51] Int. Cl.$^2$ ......................................... C09D 11/10

[58] Field of Search ............ 260/DIG. 38, 29.2 EP, 260/22 CQ; 106/31, 20

[56] References Cited

UNITED STATES PATENTS

| | | | |
|---|---|---|---|
| 3,435,618 | 4/1969 | Katzer | 61/1 |
| 3,450,658 | 6/1969 | Morison | 260/29.2 EP |
| 3,477,862 | 11/1969 | Forsyth | 260/29.2 EP |
| 3,625,715 | 12/1971 | Nasca | 260/29.2 EP |
| 3,627,546 | 12/1971 | Coppeta | 106/31 |
| 3,692,548 | 9/1972 | Packer | 106/22 |
| 3,844,994 | 10/1974 | Vijayendran | 260/DIG. 38 |
| 3,856,536 | 12/1974 | Siegelman et al. | 106/20 |

*Primary Examiner*—Murray Tillman
*Assistant Examiner*—Arthur H. Koeckert
*Attorney, Agent, or Firm*—Donald Keith Wedding

[57] ABSTRACT

A composition and method for improving the ink transfer properties of aqueous printing inks are disclosed. The composition is an aqueous ink containing from 0.1 to 1.5 percent by weight of a polyethylene oxide resin having a molecular weight in the range of from 100,000 to 350,000.

8 Claims, No Drawings

AQUEOUS PRINTING INK WITH POLYETHYLENE OXIDE

BACKGROUND OF THE INVENTION

This invention is directed to a composition and method for improved aqueous printing.

A printing process involves the distribution of ink in a uniform film, the provision of a substrate having a uniform surface, and the transfer of the ink to the substrate. The final transfer of ink from the printing surface is accomplished by means of pressure; the final force on the ink film is heavy pressure against a porous surface followed by a tension sufficient to split the ink film.

Flexographic printing is a form of "relief" printing, in which an impression is taken from the raised parts of a printing surface. Flexographic printing machines are essentially high-speed web or sheet fed rotary presses, which print with liquid inks from curved plates, usually made of rubber or other plastic material, attached to a cylinder. An important advantage of flexographic printing is that a uniform film of ink can be printed even on rough papers, because the surface of the rubber plate is sufficiently resilient to be forced into the hollows in the paper.

Flexographic printing can be used to produce a wide variety of printed material, including waxed or decorative wrappers, aluminum foil, plastic films, newsprint and corrugated papers and cartons. The inking system used in flexographic printing consists essentially of an enclosed duct to limit the evaporation of the solvent, and a simple train of rollers. Ink control is usually done by pressure on the end bearings of the inking rollers, which tends to force the rollers apart at the center. Because of this, continuous fine control and correct alignment of rollers is considered to be essential to produce acceptable printing. Although the pressure on the inking rollers may vary appreciably in letter press printing, in contrast, flexographic printing requires maintenance of pressure on inking rollers at practically zero. Because of the importance of maintaining this critical inking roller pressure, flexographic inks must be carefully tailored to have appropriate viscosity or fluidity. In addition the ink must be sufficiently volatile or penetrative to dry within seconds or less, adhere well to the printing surface, and be odorless when dry. The ink must be free of any solvents which would attack the rubber or plastic print plates.

In the case of pigmented inks, which are extensively used because of the color effects and eye appeal of the printed product, the ink should be stable and any pigment which settles out should be readily dispersible by stirring. A great amount of research has been expended in attempting to maintain satisfactory flow properties while at the same time maximizing the degree of pigmentation and improving the ink transfer properties.

Another widely used printing technique is intaglio printing, which involves taking impressions from recesses engraved or etched below the surface of a plate or cylinder. Presently, the most important of this group is rotogravure printing from polished copper electrodeposited on an iron, steel or aluminum base. The design is etched into the copper by photoengraving means. Gravure inks rely for drying mainly on solvent evaporation, and, therefore, gravure inks usually contain large amounts of hydrocarbon solvents. Not only are these solvents highly inflammable, forming explosive with the atmosphere, but the vapors are also extremely toxic. Because these undesirable properties involve significant expenditures for flameproof electrical equipment and hoods and duct work for containment and recovery of the solvent, an aqueous rotogravure ink which has suitable ink transfer properties has long been an industry need.

SUMMARY

The instant invention involves the discovery that polyethylene oxide resins can be added to aqueous printing inks to improve ink transfer properties. Specifically, from 0.1 to 1.5 percent by weight of a polyethylene oxide having a molecular weight in the range of from 100,000 to 350,000 is added to an aqueous printing ink.

It is, therefore, an object of the instant invention to provide an aqueous printing ink composition having improved transfer properties.

It is a further object of the instant invention to provide an aqueous pigmented flexographic ink which prints out stronger, has increased brilliance, increased intensity of color, and increased clarity.

It is still another object of the instant invention to provide an aqueous pigmented flexographic ink which has increased scuff resistance, and has substantially reduced mottle, feathering and striation.

Other objects and advantages will be apparent from the description which follows. The following Examples will serve to illustrate specific embodiments of the invention.

EXAMPLE I

An aqueous black pigmented flexographic ink was prepared by mixing together the following ingredients; 36 percent by weight of ink varnish, 15 percent by weight carbon black, 5 percent by weight of a combined surfactant, 10 percent by weight of a synthetic water-based resin, 1 percent by weight of wax, and 28 percent by weight water. The aqueous ink mixture was blended together in a mixer for approximately 20 minutes and then passed through a sand mill to reduce any agglomerated particles and to form a smooth finish ink. A 5 percent by weight portion of a solution consisting of 12 parts by weight polyethylene oxide in 88 parts by water was then added to the ink. Because the forces applied to the ink during the blending and sand-milling operation have been found to destroy the improvement in ink transfer properties obtained by the presence of polyethylene oxide, it is important to add the polyethylene oxide subsequent to the sand-milling.

The ink was put on a flexographic printing press and the ink viscosity adjusted by means of an efflux viscometer to 16 2 Zahn seconds and a series of corrugated cartons printed. The cartons had excellent printing color coverage. The ink ran well and washed up well on the press.

The ink varnish, along with the water-based resin used in the above formulation, functions as a vehicle which serves as a dispersing, carrying and binding medium for the pigment particles. The varnish and resin provide the necessary flow, tack and plasticity to allow the ink to distribute on the press and transfer from the rollers to the plates and in turn, to the surface to be printed. The ink varnish used in Example I was a maleic rosin solution, available from Filtered Rosin Co., under the trade designation No. 5001. The synthetic water-based resin used was a styrenated soya type, commercially available from A. E Staley Co. under the trade designation P3-103. Numerous ink varnishes and water-based resins are suitable for flexographic inks, as is known in the art. The choice of varnish and resin depends upon the speed of drying required, gloss, hardness and adhesion requirements, economic factors and the nature of the surface to be printed. The wax used was Fisher-Tropsch 215° F-223° F M.P. commercially available from Dura Commodities Co., under the trade designation Microfine VI. Solid petroleum products such as paraffin wax or micro crystalline wax are commonly added to printing ink formulations to reduce or eliminate off-setting, to keep the ink from penetrating too rapidly into the stock surface, and to impart a measure of slip and scuff-resistance.

The combined surfactant included minor amounts of the following; a nonionic surfactant, based on tetramethyl decynediol, commercially available from Air Products and Chemicals, Inc., under the trade designation Surfynol 104; lecithin, available from Ross and Rowe, Inc., a mixed aminohydroxy compound available from Commercial Solvent Corp., and a silicone defoamer available from Dow Chemical Corp.

The polyethylene oxide used was a nonionic homopolymer, commercially available from Union Carbide under the trade designation POLYOX WSR N-80. Rheological measurements indicate that the resin has a relatively narrow distribution of molecular weights and an average molecular weight of 200,000. The viscosity range, at 25° C, using a Brookfield spindle No. 1, 50 revolutions per minute, is given as 81-105 cps for a 5 percent solution.

Polyethylene oxide polymers are polar linear resins characterized by a relatively large number of polar groups in the molecule. Such polyethylene polymers can be prepared by polymerizing ethylene oxide in contact with a catalyst such as alkaline earth amide or hexammoniates as is well known in the polymer art.

Polyethylene oxides which can be used in the present invention are those which have average molecular weights in the range of 100,000 to 350,000, preferably about 200,000. The polyethylene oxide can be present in an amount of from 0.1 to 1.5 percent by weight of the ink. Preferably the polyethylene oxide is present in an amount of from 0.4 to 1.0 percent and most desirably, about 0.7 percent. Amounts greater than 1.5 percent appear to create press problems during the printing operation.

COMPARATIVE PROCEDURE A

For purposes of comparison, but not in accordance with the instant invention, a black pigmented aqueous flexographic ink composition was prepared as described in Example I, except that polyethylene oxide was not added. The ink viscosity was adjusted to 21 No. 2 Zahn seconds, and a series of corrugated cartons printed.

A side-by-side comparison of the printed cartons indicated that the composition containing polyethylene oxide showed an increased blackness of print and greater sharpness. The ink containing the polyethylene oxide had increased scuff resistance and dried faster with less smear.

EXAMPLE II

Aqueous flexographic inks having the compositions shown below were prepared as described in Example I.

| Blue | % By Weight | Red | % By Weight |
|---|---|---|---|
| Ink varnish | 20 | Ink varnish | 15 |
| Synthetic water-based varnish | 15 | Synthetic water-based varnish | 14 |
| Surfactant | 2.5 | Surfactant | 2 |
| *Clay pigment | 15 | *Clay pigment | 5 |
| Carbon black base | 2.5 | | |
| Titanium dioxide | 16.5 | Titanium dioxide | 6 |
| Phthalocyanine blue | 3 | Molybdate orange | 20 |
| Methyl violet base | 2.5 | Lithol red | 12 |
| Wax | 1.0 | Wax | 1 |
| Water | 17.5 | Water | 20 |
| **Polyethylene oxide (water solution) | 5 | **Polyethylene oxide (water solution) | 5 |

*The clay pigment functions as an extender pigment. A suitable extender is commercially available from Thiele Kaolin Co., under the trade designation Burgess No. 80.
**Prepared as described in Example I by adding 12 parts by weight polyethylene oxide to 88 parts by weight water.

The inks were placed on a flexographic printing press and the ink viscosity adjusted to 16 No. 2 Zahn seconds.

Comparative tests were conducted using corresponding red and blue inks which did not contain polyethylene oxide. The color of both the red and blue inks containing polyethylene oxide was more intense on the cartons than the color of the regular inks. In addition, the inks of the instant invention eliminated the striation which was present on the cartons printed using the regular ink.

Experimental tests were conducted to determine the effect of substituting carboxymethyl cellulose or polyvinyl alcohol for the polyethylene oxide of the present invention; no improvement of ink transfer properties was obtained.

Further experimental tests indicate that the aqueous flexographic inks of the instant invention have numerous advantages over flexographic inks known in the art. Increased color, sharpness and intensity are obtained. In addition, the inks provide virtual elimination of print striation, minimize print mottle, and mask roller defects. Other advantages include increased mileage through greater tolerance of water dilution, greater color uniformity in a high and low viscosity range, improved printing on rough surfaces and increased lubricity which reduces die wear.

Since rotogravure inks and flexographic inks both certain significant amounts of solvents and have a low viscosity aqueous rotogravure inks, containing polyethylene oxide to improve ink transfer properties and to reduce wear on the expensive copper or chromium faced cylinders can be prepared.

What I claim is:
1. A method for improving the transfer characteristics of an aqueous printing ink which comprises adding to the ink polyethylene oxide having an average molecular weight of from 100,000 to 350,000.
2. A method as claimed in claim 1 wherein the amount of polyethylene oxide added is from 0.1 to 1.5 percent by weight.
3. A method as claimed in claim 1 wherein the amount of polyethylene oxide added is 0.7 percent by weight.
4. A method as claimed in claim 1 wherein the ink is an aqueous flexographic ink.

5. An ink composition consisting essentially of an aqueous printing ink and polyethylene oxide having an average molecular weight of from 100,000 to 350,000.

6. A composition as claimed in claim 5 wherein the amount of polyethylene oxide present is from 0.1 to 1.5 percent by weight.

7. A composition as claimed in claim 5 wherein the amount of polyethylene oxide present is 0.7 percent by weight.

8. A composition as claimed in claim 5 wherein the printing ink is an aqueous flexographic ink.

* * * * *